US006407163B1

(12) United States Patent
Eichenauer

(10) Patent No.: US 6,407,163 B1
(45) Date of Patent: Jun. 18, 2002

(54) HIGHLY IMPACT-RESISTANT ABS MOULDING MATERIALS

(75) Inventor: Herbert Eichenauer, Dormagen (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/868,208

(22) PCT Filed: Dec. 7, 1999

(86) PCT No.: PCT/EP99/09559

§ 371 (c)(1),
(2), (4) Date: Jun. 13, 2001

(87) PCT Pub. No.: WO00/37559

PCT Pub. Date: Jun. 29, 2000

(30) Foreign Application Priority Data

Dec. 18, 1998 (DE) .......................................... 198 58 731

(51) Int. Cl.⁷ .............................................. C08L 55/02
(52) U.S. Cl. .............................. 525/64; 525/66; 525/67; 525/68; 525/69; 525/71
(58) Field of Search .............................. 525/64, 66, 67, 525/68, 69, 71

(56) References Cited

U.S. PATENT DOCUMENTS

| | | | |
|---|---|---|---|
| 4,430,478 A | 2/1984 | Schmitt et al. | 525/71 |
| 4,713,426 A | 12/1987 | Harris et al. | 525/471 |
| 4,874,815 A | 10/1989 | Bubeck et al. | 525/71 |
| 5,041,498 A | 8/1991 | Hare et al. | 525/71 |

FOREIGN PATENT DOCUMENTS

| | | |
|---|---|---|
| DE | 4113326 | * 10/1992 |
| EP | 0 390 781 | 10/1980 |
| EP | 0 845 497 | 6/1998 |
| WO | 91/15544 | 10/1991 |

* cited by examiner

*Primary Examiner*—Jeffrey Mullis
(74) *Attorney, Agent, or Firm*—Joseph C. Gil; Aron Preis

(57) ABSTRACT

The invention provides a combination of specific graft polymers produced by emulsion polymerization on the basis of a mixture of three rubber latices with ABS polymers produced by solution, bulk or suspension polymerization, by which products with extremely high impact strength values are obtained.

10 Claims, No Drawings

HIGHLY IMPACT-RESISTANT ABS MOULDING MATERIALS

For many years now ABS moulding compositions have been used in large quantities as thermoplastic resins for the production of moulded parts of all kinds. The property spectrum of these resins ranges from relatively brittle to very tough.

A specific field of application for ABS moulding compositions is the production of moulded parts with high demands in respect of toughness under the effect of impact, particularly also at low temperatures, and the possibility of selective adjustment (grades between glossy and matt) of the surface gloss (in the motor vehicle sector or to produce housing parts for example).

ABS products with high impact strengths and relatively high surface gloss may be produced by using traditional emulsion ABS and large quantities of rubber, but drawbacks in respect of other properties, e.g. E modulus, heat deflection temperature and thermoplastic flowability are associated with this.

ABS products with relatively low surface gloss are accessible, for example, by polymerization by the solution or bulk polymerization process; products with high low-temperature impact strength are not, however, obtained by this method.

Although certain specific improvements may be achieved by blending traditional emulsion ABS types with solution or bulk ABS types (cf. U.S. Pat. No. 4,430,478 for example), these materials do not meet the high demands in respect of impact strength and flowability while at the same time obtaining the low surface gloss characteristic of bulk ABS.

It is also known to blend ABS polymers produced by bulk polymerization with various graft rubber polymers of small and large particle size produced by emulsion polymerization (cf. U.S. Pat. Nos. 4,430,478, 4,713,420, EP-A 190 884, EP-A 390 781, EP-A 436 381 and literature cited therein for example) but the resulting products do not exhibit improved low-temperature impact strength. EP-A 845 497 describes a blend comprising ABS polymer, obtained by bulk or suspension polymerization and specific graft rubber, obtained by emulsion polymerization using two rubber components. The impact strength of the moulding compositions produced therefrom are, however, often inadequate for the production of moulded parts subject to extreme stress.

It has been found that products with extremely high impact strength values are obtained by combination of specific graft polymers produced by emulsion polymerization on the basis of a blend of three rubber latices with ABS polymers produced by solution, bulk or suspension polymerization.

The invention provides high impact ABS moulding compositions containing

I) a graft rubber polymer, which is obtainable by emulsion polymerization of styrene and acrylonitrile in the weight ratio 90:10 to 50:50, wherein styrene and/or acrylonitrile may be wholly or partially replaced by α-methyl styrene, methyl methacrylate or N-phenyl maleinimide, in the presence of a mixture comprising a butadiene polymer latex (A) with an average particle diameter $d_{50} \leq 230$ nm, preferably 150 to 220 nm, particularly preferably 170 to 215 nm and most particularly preferably 175 to 200 nm, and a gel content of 40 to 95 wt. %, preferably 50 to 90 wt. % and particularly preferably 60 to 85 wt. %, a butadiene polymer latex (B) with an average particle diameter $d_{50}$ of 250 to 330 nm, preferably 260 to 320 nm and particularly preferably 270 to 310 nm and a gel content of 35 to 75 wt. %, preferably 40 to 70 wt. % and particularly preferably 45 to 60 wt. %, and a butadiene polymer latex (C) with an average particle diameter $d_{50} \geq 350$ nm, preferably 370 to 450 nm, particularly preferably 375 to 430 nm and most particularly preferably 380 to 425 nm and a gel content of 60 to 90 wt. %, preferably 65 to 85 wt. % and particularly preferably 70 to 80 wt. %, wherein the butadiene polymer latices each contain 0 to 50 wt. % of a further vinyl monomer in copolymerized manner and wherein the ratio by mass of graft monomers used to butadiene polymers used is 10:90 to 60:40, preferably 20:80 to 50:50 and particularly preferably 25:75 to 45:55, II) at least one graft polymer, which is obtainable by solution, bulk or suspension polymerization of styrene and acrylonitrile in the weight ratio 90:10 to 50:50, wherein styrene and/or acrylonitrile may be wholly or partially replaced by α-methyl styrene, methyl methacrylate or N-phenyl maleinimide, in the presence of a rubber, wherein the rubber contains 0 to 50 wt. % of a further vinyl monomer in copolymerized manner and wherein the ratio by mass of graft monomers used to rubber used is 50:50 to 97:3, preferably 70:30 to 95:5, and optionally III) at least one rubber-free copolymer comprising styrene and acrylonitrile in the weight ratio 90:10 to 50:50, wherein styrene and/or acrylonitrile may be wholly or partially replaced by α-methyl styrene, methyl methacrylate or N-phenyl maleinimide.

In general the moulding compositions according to the invention may contain 1 to 50 parts by weight, preferably 2.5 to 45 parts by weight, and particularly preferably 5 to 40 parts by weight of I, 50 to 99 parts by weight, preferably 55 to 97.5 parts by weight, and particularly preferably 60 to 95 parts by weight of II, 0 to 100 parts by weight, preferably 0 to 80 parts by weight, and particularly preferably 0 to 60 parts by weight of III.

Furthermore, the moulding compositions according to the invention may contain further rubber-free thermoplastic resins not composed of vinyl monomers, wherein these thermoplastic resins are used in quantities up to 500 parts by weight, preferably up to 400 parts by weight and particularly preferably up to 300 parts by weight (related to 100 parts by weight of I)+II)+III) in each case).

In the production of the graft rubber polymer (I) the butadiene polymer latices (A), (B) and (C) are preferably used in contents of 10 to 40 wt. %, preferably 20 to 37.5 wt. % and particularly preferably 22.5 to 35 wt. % of (A), 10 to 70 wt. %, preferably 20 to 65 wt. % and particularly preferably 30 to 60 wt. % of (B) and 5 to 50 wt. %, preferably 7.5 to 45 wt. % and particularly preferably 10 to 40 wt. % of (C) (related to the particular solids content of the latices in each case).

In the production of the graft rubber polymer (I), as a further preferred group the butadiene polymer latices (A), (B) and (C) are used in contents of 10 to 40 wt. %, preferably 20 to 35 wt. % of (A), 30 to 70 wt. %, preferably 35 to 65 wt. % of (B) and 5 to 45 wt. %, preferably 10 to 35 wt. % of (C) (related to the particular solids content of the latices in each case).

In particular the butadiene polymer latices (A), (B) and (C) are used in such quantities that the equations $B \leq A+C$, $B>A$ and $B>C$ apply for the quantities of rubber.

The butadiene polymer latices (A), (B) and (C) may be produced by emulsion polymerization of butadiene. This polymerization process is known and described, for example, in Houben-Weyl, Methoden der Organischen Chemie, Makromolekulare Stoffe, Part 1, p. 674 (1961), Thieme Verlag publishers, Stuttgart. Up to 50 wt. %, preferably up to 30 wt. % (related to the entire quantity of monomer used for butadiene polymer production) of one or more monomers copolymerizable with butadiene may be used as comonomers.

Examples of such monomers are isoprene, chloroprene, acrylonitrile, styrene, α-methyl styrene, $C_1$–$C_4$ alkyl styrenes, $C_1$–$C_8$ alkyl acrylates, $C_1$–$C_8$ alkyl methacrylates, alkylene glycol diacrylates, alkylene glycol dimethacrylates, divinyl benzene; preferably butadiene is used alone. In the production of (A), (B) and (C) it is also possible initially to produce a fine-particle butadiene polymer by known methods and then agglomerate it in known manner to set the required particle diameter.

Relevant methods are described (cf. EP B 0 029 613; EP B 0 007 810; DD-PS 144 415; DE-AS 1 233 131; DE-AS 1 258 076; DE-OS 2 101 650; U.S. Pat. No. 1,379,391).

It is also possible to work according to the so-called seed polymerization method in which a fine-particle butadiene polymer is initially produced and then further polymerized to larger particles by further conversion with monomers containing butadiene.

In principle the butadiene polymer latices (A), (B) and (C) may also be produced by emulsifying fine-particle butadiene polymers in aqueous media (cf. Japanese patent application 55 125 102).

The butadiene polymer latex (A) has an average particle diameter $d_{50} \leq 230$ nm, preferably 150 to 220 nm, particularly preferably 170 to 215 nm and most particularly preferably 175 to 200 nm, and a gel content of 40 to 95 wt. %, preferably 50 to 90 wt. % and particularly preferably 60 to 85 wt. %. The butadiene polymer latex (B) has an average particle diameter $d_{50}$ of 250 to 330 run, preferably 260 to 320 run and particularly preferably 270 to 310 nm and a gel content of 35 to 75 wt. %, preferably 40 to 70 wt. % and particularly preferably 45 to 60 wt. %.

The butadiene polymer latex (C) has an average particle diameter $d_{50} \geq 350$ nm, preferably 370 to 450 nm, particularly preferably 375 to 430 nm and most particularly preferably 380 to 425 nm and a gel content of 60 to 90 wt. %, preferably 65 to 85 wt. % and particularly preferably 70 to 80 wt. %.

The average particle diameter $d_{50}$ may be determined by ultracentrifuge measurement (cf. W. Scholtan, H. Lange: Kolloid Z. u. Z. Polymere 250, p. 782 to 796 (1972)), the values quoted for the gel content relate to determination by the wire cage method toluene (cf. Houben-Weyl, Methoden der Organischen Chemie, Makromolekulare Stoffe, Part 1, p. 307 (1961), Thieme Verlag publishers, Stuttgart).

In known manner in principle the gel contents of the butadiene polymer latices (A), (B) and (C) may be set by use of suitable reaction conditions (e.g. high reaction temperature and/or polymerization up to high conversion and optionally addition of substances with crosslinking action to achieve a high gel content or, for example, low reaction temperature and/or termination of the polymerization reaction before too much crosslinking occurs and optionally addition of molecular weight regulators such as for example n-dodecyl mercaptan or t-dodecyl mercaptan to achieve a low gel content). The conventional anionic emulsifiers such as alkyl sulfates, alkyl sulfonates, aralkyl sulfonates, soaps of saturated or unsaturated fatty acids and alkaline disproportionated or hydrogenated abietic or tall oil acids may be used as emulsifiers, preferably emulsifiers with carboxyl groups (e.g. salts of $C_{10}$–$C_{18}$ fatty acids, disproportionated abietic acid) are used.

In the production of the graft polymer I) the graft polymerization may be carried out in such a way that the monomer mixture is continuously added to the mixture of the butadiene polymer latices (A), (B) and (C) and polymerized.

Specific monomer/rubber ratios are preferably maintained and the monomers added to the rubber latex in a known manner.

To produce the component I) according to the invention, preferably 15 to 50 parts by weight, particularly preferably 20 to 40 parts by weight, of a mixture comprising styrene and acrylonitrile, which may optionally contain up to 50 wt. % (related to total quantity of monomers used in the graft polymerization) of one or more comonomers, are polymerized in the presence of preferably 50 to 85 parts by weight, particularly preferably 60 to 80 parts by weight (related to solid in each case) of the butadiene polymer latex mixture comprising (A), (B) and (C).

The monomers used in the graft polymerization are preferably mixtures comprising styrene and acrylonitrile in the weight ratio 90:10 to 50:50, particularly preferably in the weight ratio 65:35 to 75:25, wherein styrene and/or acrylonitrile may be wholly or partially replaced by copolymerizable monomers, preferably by α-methyl styrene, methyl methacrylate or N-phenyl maleinimide.

Molecular weight regulators may additionally be used in the graft polymerization, preferably in quantities of 0.05 to 2 wt. %, particularly preferably in quantities of 0.1 to 1 wt. % (related to total monomer quantity in the graft polymerization stage in each case).

Examples of suitable molecular weight regulators are alkyl mercaptans such as n-dodecyl mercaptan, t-dodecyl mercaptan; dimeric α-methyl styrene; terpinolene.

Initiators which may be considered are inorganic and organic peroxides, for example $H_2O_2$, di-tert.-butyl peroxide, cumene hydroperoxide, dicyclohexyl percarbonate, tert.-butyl hydroperoxide, p-menthane hydroperoxide, azo initiators such as azobisisobutyronitrile, inorganic per salts such as ammonium, sodium or potassium persulfate, potassium perphosphate, sodium perborate and redox systems. Redox systems generally consist of an organic oxidizing agent and a reducing agent, it being possible for heavy metal ions additionally to be present in the reaction medium (see Houben-Weyl, Methoden der Organischen Chemie, Vol. 14/1, p. 263 to 297).

The polymerization temperature is 25° C. to 160° C., preferably 40° C. to 90° C. Suitable emulsifiers are quoted above.

To produce the component I) according to the invention the graft polymerization may preferably be carried out by monomer feed in such a way that 55 to 90 wt. %, preferably 60 to 80 wt. % and particularly preferably 65 to 75 wt. % of the entire monomers to be used in the graft polymerization are metered in within the first half of the total monomer metering time; the remaining monomer content is metered in within the second half of the total monomer metering time. The production of component II) is known (cf., for example, DE-OS 1 300 241, DE-OS 2 659 175, EP 67 536, EP 103 657, EP 412 801, EP 505 798, U.S. Pat. Nos. 4,252,911, 4,362,850, 5,286,792 and the literature cited in those documents). Styrene and acrylonitrile may be polymerized in the weight ratio 90:10 to 50:50, preferably in the weight ratio 65:35 to 75:25, wherein styrene and/or acrylonitrile may be wholly or partially replaced by copolymerizable monomers, preferably by α-methyl styrene, methyl methacrylate or N-phenyl maleinimide, in the presence of a soluble rubber according to known methods of solution, bulk or suspension polymerization.

Rubbers with a glass transition temperature $\leq 10°$ C. are used; polybutadiene, butadiene/styrene copolymers (e.g. statistical copolymers, block copolymers, star copolymers), butadiene/acrylonitrile copolymers and polyisoprene are preferred.

Polybutadiene and butadiene/styrene copolymers are particularly preferred rubbers for producing component II).

The rubber contents of component II) according to the invention are 3 to 50 wt. %, preferably 5 to 30 wt. %, and particularly preferably 6 to 25 wt. %.

In component II) the rubbers are present in the form of rubber phases with average particle diameters of approx. 100 nm to above 10,000 nm, ABS polymers with average particle diameters of the rubber phase of 200 nm to 5,000 run, particularly preferably 400 nm to 2,000 nm, particularly 500 to 1,500 nm, are preferably used.

Copolymers of styrene and acrylonitrile in the weight ratio 90:10 to 50:50 are employed as optionally additionally used rubber-free copolymers III), wherein styrene and/or acrylonitrile may be wholly or partially replaced by α-methyl styrene, methyl methacrylate or N-phenyl maleinimide.

Copolymers III) with contents of incorporated acrylonitrile units <30 wt. % are particularly preferred.

The copolymers III) preferably have average molecular weights $\overline{M}_w$ of 20,000 to 200,000 and/or intrinsic viscosities [η] of 20 to 110 ml/g (measured in dimethyl formamide at 25° C.).

Particulars on the production of these resins are described in DE-AS 2 420 358 and DE-AS 2 724 360 for example. Vinyl resins produced by bulk and/or solution polymerization have proved particularly successful.

The copolymers may be added alone or in any mixture.

Apart from thermoplastic resins composed of vinyl monomers, the use of polycondensates, e.g. aromatic polycarbonates, aromatic polyester carbonates, polyesters, polyamides is also possible as rubber-free copolymer in the moulding compositions according to the invention.

Suitable thermoplastic polycarbonates and polyester carbonates are known (cf. for example DE-AS 1 495 626, DE-OS 2 232 877, DE-OS 2 703 376, DE-OS 2 714 544, DE-OS 3 000 610, DE-OS 3 832 396, DE-OS 3 077 934), which may be produced, for example, by reaction of diphenols of formulae (I) and (II)

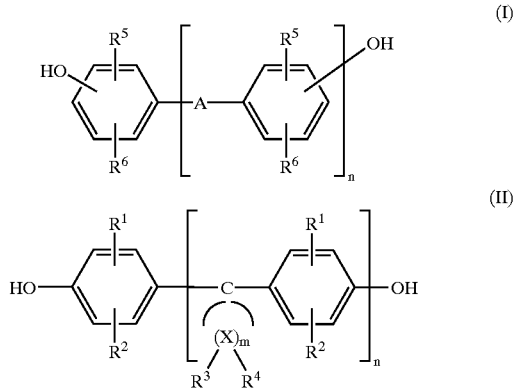

in which
A is a single bond, $C_1$–$C_5$ alkylene, $C_2$–$C_5$ alkylidene, $C_5$–$C_6$ cycloalkylidene, —O—, —S—, —SO—, —$SO_2$— or —CO—, $R^5$ and $R^6$ independently of each other stand for hydrogen, methyl or halogen, particularly for hydrogen, methyl, chlorine or bromine, $R^1$ and $R^2$ independently of each other mean hydrogen, halogen, preferably chlorine or bromine, $C_1$–$C_8$-alkyl, preferably methyl, ethyl, $C_5$–$C_6$-cycloalkyl, preferably cyclohexyl, $C_6$–$C_{10}$-aryl, preferably phenyl, or $C_7$–$C_{12}$-aralkyl, preferably phenyl-$C_1$–$C_4$-alkyl, particularly benzyl, m is a whole number from 4 to 7, preferably 4 or 5, n is 0 or 1, $R^3$ and $R^4$ are individually selectable for each X and independently of each other mean hydrogen or $C_1$–$C_6$-alkyl and X means carbon, with carbonic acid halides, preferably phosgene, and/or with aromatic dicarboxylic acid dihalides, preferably benzene dicarboxylic acid dihalides, by phase interface polycondensation or with phosgene by polycondensation in homogeneous phase (the so-called pyridine method), it being possible to set the molecular weight in known manner by a corresponding quantity of known chain terminators.

Examples of suitable diphenols of formulae (I) and (II) are hydroquinone, resorcinol, 4,4'-dihydroxydiphenyl, 2,2-bis-(4-hydroxyphenyl)-propane, 2,4-bis-(4-hydroxyphenyl)-2-methyl butane, 2,2-bis-(4-hydroxy-3,5-dimethylphenyl)-propane, 2,2-bis-(4-hydroxy-3,5-dichlorophenyl)-propane, 2,2-bis-(4-hydroxy-3,5-dibromophenyl)-propane, 1,1-bis-(4-hydroxyphenyl)-cyclohexane, 1,1-bis-(4-hydroxyphenyl)-3,3,5-trimethyl cyclohexane, 1,1-bis-(4-hydroxyphenyl)-3,3-dimethyl cyclohexane, 1,1-bis-(4-hydroxyphenyl)-3,3,5,5-tetramethyl cyclohexane or 1,1-bis-(4-hydroxyphenyl)-2,4,4,-trimethyl cyclopentane.

Preferred diphenols of formula (I) are 2,2-bis-(4-hydroxyphenyl)-propane and 1,1-bis-(4-hydroxyphenyl)-cyclohexane, preferred phenol of formula (II) is 1,1-bis-(4-hydroxyphenyl)-3,3,5-trimethyl cyclohexane.

Mixtures of diphenols may also be used.

Examples of suitable chain terminators are phenol, p-tert.-butyl phenol, long-chain alkyl phenols such as 4-(1,3-tetramethyl-butyl)phenol according to DE-OS 2 842 005, monoalkyl phenols, dialkyl phenols with a total of 8 to 20 C atoms in the alkyl substituent according to DE-OS 3 506 472, such as p-nonyl phenol, 2,5-di-tert.-butyl phenol, p-tert.-octyl phenol, p-dodecyl phenol, 2-(3,5-dimethylheptyl)-phenol and 4-(3,5-dimethylheptyl)-phenol. The required quantity of chain terminators is generally 0.5 to 10 mole %, related to the sum of diphenols (I) and (II).

The suitable polycarbonates and/or polyester carbonates may be linear or branched; branched products are preferably obtained by the incorporation of 0.05 to 2.0 mole %, related to the sum of the diphenols used, of tri- or more than tri-functional compounds e.g. those with three or more than three phenolic OH groups.

The suitable polycarbonates and/or polyester carbonates may contain aromatically bound halogen, preferably bromine and/or chlorine; preferably they are halogen-free.

They have average molecular weights ($\overline{M}_w$, weight average) determined, for example, by ultracentrifuging or light scattering measurement, of 10,000 to 200,000, preferably of 20,000 to 80,000.

Suitable thermoplastic polyesters are preferably polyalkylene terephthalates, i.e. reaction products of aromatic dicarboxylic acids or reactive derivatives thereof (e.g. dimethyl esters or anhydrides) and aliphatic, cycloaliphatic or arylaliphatic diols and mixtures of such reaction products.

Preferred polyalkylene terephthalates may be produced from terephthalic acids (or reactive derivatives thereof) and aliphatic or cycloaliphatic diols with 2 to 10 C atoms, by known methods (Kunststoff-Handbuch, Vol. VIII, p. 695 et seq., Carl Hanser Verlag publishers, Munich 1973).

In preferred polyalkylene terephthalates 80 to 100, preferably 90 to 100 mole % of the dicarboxylic acid groups, terephthalic acid groups, and 80 to 100, preferably 90 to 100 mole % of the diol groups are ethylene glycol and/or butane-1,4-diol groups.

In addition to ethylene glycol and/or butane-1,4-diol groups the preferred polyalkylene terephthalates may contain 0 to 20 mole % of groups of other aliphatic diols with 3 to 12 C atoms or cycloaliphatic diols with 6 to 12 C atoms, e.g. groups of propane-1,3-diol, 2-ethyl-propane-1,3-diol, neopentyl glycol, pentane-1,5-diol, hexane-1,6-diol, cyclohexanedi-1,4-methanol, 3-methylpentane-1,3- and 1,6-diol, 2-ethylbexane-1,3-diol, 2,2-diethylpropane-1,3-diol, hexane-2,5-diol, 1,4-(di(β-hydroxyethoxy)-benzene, 2,2-bis-(4-hydroxycyclohexyl)-propane, 2,4-dihydroxy-1,1,3,3-tetramethyl cyclobutane, 2,2-bis-(3-β-hydroxyethoxyphenyl)-propane and 2,2-bis-(4-hydroxypropoxyphenyl)-propane (DE-OS 2 407 647, 2 407 776, 2 715 932).

The polyalkylene terephthalates may be branched by incorporation of relatively small quantities of trihydric or tetrahydric alcohols or tribasic or tetrabasic carboxylic acids, such as are described in DE-OS 1 900 270 and U.S. Pat. No. 3,692,744. Examples of preferred branching agents are trimesic acid, trimellitic acid, trimethylol-ethane and -propane and pentaerythritol. It is advisable to use not more than 1 mole % of the branching agent, related to the acid component.

Polyalkylene terephthalates which have been produced solely from terephthalic acid and reactive derivatives thereof (e.g. dialkyl esters thereof) and ethylene glycol and/or butane-1,4-diol and mixtures of these polyalkylene terephthalates are particularly preferred. Copolyesters which are produced from at least two of the above-mentioned alcohol components are also preferred polyalkylene terephthalates: poly-(ethyleneglycol butane-1,4-diol)-terephthalates are particularly preferred copolyesters.

The preferably suitable polyalkylene terephthalates generally have an intrinsic viscosity of 0.4 to 1.5 dl/g, preferably 0.5 to 1.3 dl/g, particularly 0.6 to 1.2 dl/g, measured in phenol/o-dichlorobenzene (1:1 parts by weight) at 25° C. in each case.

Suitable polyamides are known homopolyamides, copolyamides and mixtures of these polyamides. These may be partially crystalline and/or amorphous polyamides.

Polyamide-6, polyamide-6,6, mixtures and corresponding copolymers comprising these components are suitable as partially crystalline polyamides. Also considered are partially crystalline polyamides, the acid component of which wholly or partly consists of terephthalic acid and/or isophthalic acid and/or suberic acid and/or sebacic acid and/or azelaic acid and/or adipic acid and/or cyclohexane dicarboxylic acid, the diamine component of which wholly or partially consists of m- and/or p-xylylene-diamine and/or hexamethylene diamine and/or 2,2,4-trimethyl hexamethylene diamine and/or 2,4,4-trimethyl hexamethylene diamine and/or isophoron diamine and the composition of which is known in principle.

Polyamides which are wholly or partially produced from lactams with 7–12 C atoms in the ring, optionally with the co-use of one or more of the above-mentioned starting components, may also be mentioned.

Polyamide-6 and polyamide-6,6 and mixtures thereof are particularly preferred partially crystalline polyamides. Known products may be used as amorphous polyamides. They are obtained by polycondensation of diamines such as ethylene diamine, hexamethylene diamine, decamethylene diamine, 2,2,4- and/or 2,4,4-trimethyl hexamethylene diamine, m- and/or p-xylylene diamine, bis-(4-aminocyclohexyl)-methane, bis-(4-aminocyclohexyl)-propane, 3,3'-dimethyl-4,4'-diamino-dicyclohexyl methane, 3-aminomethyl-3,5,5,-trimethyl cyclohexylamine, 2,5- and/or 2,6-bis-(aminomethyl)-norbornene and/or 1,4-diaminomethyl cyclohexane with dicarboxylic acids such as oxalic acid, adipic acid, azelaic acid, decane dicarboxylic acid, heptadecane dicarboxylic acid, 2,2,4- and/or 2,4,4-trimethyl adipic acid, isophthalic acid and terephthalic acid.

Copolymers which are obtained by polycondensation of several monomers are also suitable, also copolymers which are produced with addition of aminocarboxylic acids such as ε-aminocaproic acid, ω-aminoundecanoic acid or ω-aminolauric acid or lactams thereof.

Particularly suitable amorphous polyamides are the polyamides produced from isophthatic acid, hexamethylene diamine and further diamines such as 4,4'-diamirodicyclohexyl methane, isophoron diamine, 2,2,4- and/or 2,4,4-trimethyl hexamethylene diamine, 2,5- and/or 2,6-bis-(aminomethyl)-norbornene; or from isophthalic acid, 4,4'-diamino-dicyclohexyl methane and ε-caprolactam; or from isophthalic acid, 3,3'-dimethyl-4,4'-diamino-dicyclohexyl methane and laurinlactam; or from terephthalic acid and the isomer mixture comprising 2,2,4- and/or 2,4,4-trimethyl hexamethylene diamine.

Instead of the pure 4,4'-diaminodicyclohexyl methane, mixtures of the positional isomeric diaminodicyclohexyl methanes may also be used, which are composed of 70 to 99 mole % of the 4,4'-diamino isomer 1 to 30 mole % of the 2,4'-diamino isomer 0 to 2 mole % of the 2,2'-diamino isomer and optionally correspondingly more highly condensed diamines which are obtained by hydrogenation of technical-grade diaminodiphenyl methane. Up to 30% of the isophthalic acid may be replaced by terephthalic acid.

The polyamides preferably have a relative viscosity (measured on a 1 wt. % solution in m-cresol at 25° C.) of 2.0 to 5.0, particularly preferably 2.5 to 4.0.

Preferred moulding compositions according to the invention contain 1 to 50 parts by weight, preferably 2.5 to 45 parts by weight and particularly preferably 5 to 40 parts by weight of graft polymer component I) and 50 to 99 parts by weight, preferably 55 to 97.5 parts by weight and particularly preferably 60 to 95 parts by weight of graft polymer component II).

If copolymer component III) is additionally used the quantity is up to 100 parts by weight, preferably up to 80 parts by weight and particularly preferably up to 60 parts by weight of component III).

If further rubber-free thermoplastic resins not composed of vinyl monomers are additionally used, the quantity thereof is up to 500 parts by weight, preferably up to 400 parts by weight and particularly preferably up to 300 parts by weight (related to 100 parts by weight of I)+II)+III)) in each case).

The moulding compositions according to the invention are produced by mixing components I), II) and III) in conventional mixing equipment (preferably multiroll mills, compounding extruders or internal mixers).

The invention thus further provides a process for producing the moulding compositions according to the invention, wherein components I), II) and III) are mixed and, at elevated temperature, generally at temperatures of 150° C. to 300° C., compounded and extruded.

The required and/or appropriate additives, e.g. antioxidants, UV stabilizers, peroxide decomposers, anti-static agents, lubricants, mould release agents, flameproofing agents, fillers or reinforcing substances (glass fibres, carbon fibres etc.), colorants, may be added to the moulding compositions according to the invention in the course of production, preparation, further processing and final moulding.

Final moulding may be undertaken on common commercial processing equipment and comprises, for example, processing by injection-moulding, sheet extrusion with optionally subsequent thermoforming, cold forming, extrusion of pipes and profiles, calender processing.

In the examples which follow, the parts quoted are parts by weight and the percentages quoted percentages by weight at all times unless otherwise stated.

EXAMPLES

Components

ABS graft polymer 1 (Component I)

15 parts by weight (calculated as solids) of an anionically emulsified polybutadiene latex produced by radical polymerization with a $d_{50}$ value of 183 nm and a gel content of 79 wt. %, 30 parts by weight (calculated as solids) of an anionically emulsified polybutadiene latex produced by radical polymerization with a $d_{50}$ value of 305 nm and a gel content of 55 wt. % and 15 parts by weight (calculated as solids) of an anionically emulsified polybutadiene latex produced by radical polymerization with a $d_{50}$ value of 423 nm and a gel content of 78 wt. % are brought to a solids content of approx. 20 wt. % with water, after which heating to 63° C. and mixing with 0.5 parts by weight of potassium peroxodisulfate (dissolved in water) take place. 40 parts by weight of a mixture comprising 73 wt. % of styrene and 27 wt. % of acrylonitrile and 0.12 parts by weight of tert.-dodecyl mercaptan are then uniformly metered in within four hours, in parallel thereto 1 part by weight (calculated as solid substance) of the sodium salt of a resin acid mixture (Dresinate 731, Abieta Chemie GmbH, Gersthofen, Germany, dissolved in water which has been made alkaline) is metered in over a period of four hours. After four hours' post-reaction time the graft latex is coagulated with a magnesium sulfate/acetic acid mixture after addition of approx. 1.0 parts by weight of a phenolic anti-oxidant and after washing with water the resulting powder is vacuum-dried at 70° C.

ABS graft polymer 2 (Component I)

17.5 parts by weight (calculated as solids) of an anionically emulsified polybutadiene latex produced by radical polymerization with a $d_{50}$ value of 183 nm and a gel content of 79 wt. %, 35 parts by weight (calculated as solids) of an anionically emulsified polybutadiene latex produced by radical polymerization with a $d_{50}$ value of 305 nm and a gel content of 55 wt. % and 17.5 parts by weight (calculated as solids) of an anionically emulsified polybutadiene latex produced by radical polymerization with a $d_{50}$ value of 423 nm and a gel content of 78 wt. % are brought to a solids content of approx. 20 wt. % with water, after which heating to 63° C. and mixing with 0.4 parts by weight of potassium peroxodisulfate (dissolved in water) take place. 30 parts by weight of a mixture comprising 73 wt. % of styrene and 27 wt. % of acrylonitrile and 0.1 parts by weight of tert.-dodecyl mercaptan are then uniformly metered in within four hours. Further production is as described for ABS graft polymer 1.

ABS graft polymer 3 (Component I)

17.5 parts by weight (calculated as solids) of an anionically emulsified styrene/butadiene=10:90-copolymer produced by radical polymerization with a $d_{50}$ value of 182 nm and a gel content of 71 wt. %, 30 parts by weight (calculated as solids) of an anionically emulsified polybutadiene latex produced by radical polymerization with a $d_{50}$ value of 288 nm and a gel content of 51 wt. % and 12.5 parts by weight (calculated as solids) of an anionically emulsified polybutadiene latex produced by radical polymerization with a $d_{50}$ value of 410 nm and a gel content of 75 wt. % are brought to a solids content of approx. 20 wt. % with water, after which heating to 63° C. and mixing with 0.5 parts by weight of potassium peroxodisulfate (dissolved in water) take place. 40 parts by weight of a mixture comprising 73 wt. % of styrene and 27 wt. % of acrylonitrile and 0.12 parts by weight of tert.-dodecyl mercaptan are then uniformly metered in within four hours. Further production is as described for ABS graft polymer 1.

ABS graft polymer 4 (Comparative material, not according to the invention)

The formula under "ABS graft polymer 1" is repeated, a mixture comprising 30 parts by weight of the polybutadiene latex with a $d_{50}$ value of 305 nm and a gel content of 55 wt. % and 30 parts by weight (calculated as solids in each case) of the polybutadiene latex with a $d_{50}$ value of 423 nm and a gel content of 78 wt. % being used instead of the polybutadiene latex mixture.

ABS graft polymer 5 (Comparative material, not according to the invention)

The formula under "ABS graft polymer 1" is repeated, 60 parts by weight (calculated as solids) of the polybutadiene latex with a $d_{50}$ value of 423 nm and a gel content of 78 wt. % being used instead of the polybutadiene latex mixture.

ABS graft polymer 6 (Component II)

Bulk ABS Magnum 3504 (Dow Chemical Europe S.A., Horgen, Switzerland) with a rubber content of approx. 10 wt. % and an average particle diameter of the rubber phase of approx. 900 nm.

ABS graft polymer 7 (Component II)

ABS polymer produced by suspension polymerization with a rubber content of approx. 15 wt. % (styrene:acrylonitrile weight ratio=74:26) and an average particle diameter of the rubber phase of approx. 800 nm.

Resin component 1 (Component III)

Statistical styrene/acrylonitrile copolymer (styrene:acrylonitrile weight ratio 72:28) with an $\overline{M}_w$ of approx. 85,000 and $\overline{M}_w/\overline{M}_n^{-1} \leq 2$ obtained by radical solution polymerization.

Moulding compositions

The above-mentioned polymer components in the contents quoted in Table 1, 2 parts by weight of ethylene diamine bisstearylamide and 0.1 parts by weight of a silicone oil are mixed in an internal mixer and processed into test bars and a flat sheet (to assess the surface) after granulation.

The following data are obtained:

Notch impact strength at room temperature ($a_k^{RT}$) and at −40° C. ($a_k^{-40°}$ C.) to ISO 180/1A (unit: kJ/m²), ball indentation hardness ($H_c$) to DIN 53456 (unit: N/mm²), thermoplastic flowability (MVI) to DIN 53735U (unit: cm³/10 mins) and surface gloss to DIN 67530 at a reflection angle of 20° (reflectometer value).

From the examples (for test data see Table 2) it can be seen that the moulding compositions according to the invention are distinguished by extremely high impact strength values without any negative influence on the remaining properties.

TABLE 1

Composition of moulding compositions

| Example | ABS graft polymer 1 (parts by weight) | ABS graft polymer 2 (parts by weight) | ABS graft polymer 3 (parts by weight) | ABS graft polymer 4 (parts by weight) | ABS graft polymer 5 (parts by weight) | ABS graft polymer 6 (parts by weight) | ABS graft polymer 7 (parts by weight) | Resin component 1 (parts by weight) |
|---|---|---|---|---|---|---|---|---|
| 1 | 10 | | | | | 90 | | |
| 2 | 20 | | | | | 80 | | |
| 3 | 30 | | | | | 70 | | |
| 4 | | 8.6 | | | | 91.4 | | |
| 5 | | 17.2 | | | | 82.8 | | |
| 6 | | 25.8 | | | | 74.2 | | |
| 7 (comp.) | | | | 10 | | 90 | | |
| 8 (comp.) | | | | 20 | | 80 | | |
| 9 (comp.) | | | | 30 | | 70 | | |
| 10 (comp.) | | | | | 10 | 90 | | |
| 11 (comp.) | | | | | 20 | 80 | | |
| 12 (comp.) | | | | | 30 | 70 | | |
| 13 | | | 20 | | | | 80 | |
| 14 | | | 30 | | | | 70 | |
| 15 | 20 | | | | | | 60 | 20 |
| 16 (comp.) | | | | 20 | | | 60 | 20 |
| 17 (comp.) | | | | | 20 | | 60 | 20 |

TABLE 2

Test data for the moulding compositions

| Example | RT $a_k$ (kJ/m$^2$) | −40° C. $a_k$ (kJ/m$^2$) | Hc (N/mm$^2$) | MVI (cm$^3$/10 mins) | Degree of gloss |
|---|---|---|---|---|---|
| 1 | 39.6 | 17.2 | 80 | 8.1 | 66 |
| 2 | 47.3 | 28.2 | 69 | 6.9 | 69 |
| 3 | 50.7 | 34.2 | 62 | 5.4 | 67 |
| 4 | 40.7 | 17.0 | 79 | 7.4 | 54 |
| 5 | 47.8 | 30.2 | 69 | 6.7 | 57 |
| 6 | 50.5 | 34.8 | 63 | 5.2 | 64 |
| 7 (comp.) | 36.0 | 15.8 | 74 | 7.9 | 70 |
| 8 (comp.) | 43.6 | 27.0 | 65 | 6.4 | 68 |
| 9 (comp.) | 46.0 | 28.9 | 56 | 5.5 | 67 |
| 10 (comp.) | 32.7 | 11.0 | 75 | 8.5 | 68 |
| 11 (comp.) | 34.3 | 13.0 | 68 | 7.4 | 69 |
| 12 (comp.) | 31.0 | 17.9 | 56 | 6.0 | 70 |
| 13 | 40.1 | 26.3 | 62 | 6.4 | 67 |
| 14 | 44.4 | 32.5 | 60 | 5.5 | 69 |
| 15 | 45.0 | 22.3 | 80 | 16.4 | 70 |
| 16 (comp.) | 41.2 | 20.0 | 78 | 15.8 | 71 |
| 17 (comp.) | 32.1 | 12.4 | 80 | 17.6 | 71 |

What is claimed is:

1. Moulding compositions containing

I) a graft rubber polymer, which is obtainable by emulsion polymerization of styrene and acrylonitrile in the weight ratio 90:10 to 50:50, wherein styrene and/or acrylonitrile may be wholly or partially replaced by α-methyl styrene, methyl methacrylate or N-phenyl maleinimide, in the presence of a mixture comprising a butadiene polymer latex (A) with an average particle diameter $d_{50} \leqq 230$ nm and a gel content of 40 to 95 wt. %, a butadiene polymer latex (B) with an average particle diameter $d_{50}$ of 250 to 330 nm and a gel content of 35 to 75 wt. % and a butadiene polymer latex (C) with an average particle diameter $d_{50} \geqq 350$ nm and a gel content of 60 to 90 wt. %, wherein the butadiene polymer latices each contain 0 to 50 wt. % of a further vinyl monomer in copolymerized manner and wherein the ratio by mass of graft monomers used to butadiene polymers used is 10:90 to 60:40, II) at least one graft polymer, which is obtainable by solution, bulk or suspension polymerization of styrene and acrylonitrile in the weight ratio 90:10 to 50:50, wherein styrene and/or acrylonitrile may be wholly or partially replaced by α-methyl styrene, methyl methacrylate or N-phenyl maleinimide, in the presence of a rubber, wherein the rubber contains 0 to 50 wt. % of a further vinyl monomer in copolymerized manner and wherein the ratio by mass of graft monomers used to rubber used is 50:50 to 97:3, and optionally III) at least one rubber-free copolymer comprising styrene and acrylonitrile in the weight ratio 90:10 to 50:50, wherein styrene and/or acrylonitrile may be wholly or partially replaced by α-methyl styrene, methyl methacrylate or N-phenyl maleinimide.

2. Moulding composition containing

I) a graft rubber polymer, which is obtainable by emulsion polymerization of styrene and acrylonitrile in the weight ratio 90:10 to 50:50, wherein styrene and/or acrylonitrile may be wholly or partially replaced by α-methyl styrene, methyl methacrylate or N-phenyl maleinimide, in the presence of a mixture comprising a butadiene polymer latex (A) with an average particle diameter of 150 to 220 nm and a gel content of 50 to 90 wt. %, a butadiene polymer latex (B) with an average particle diameter $d_{50}$ of 260 to 320 nm and a gel content of 40 to 70 wt. % and a butadiene polymer latex (C) with an average particle diameter $d_{50}$ of 370 to 450 nm and a gel content of 65 to 85 wt. %, wherein the butadiene polymer latices each contain 0 to 50 wt. % of a further vinyl monomer in copolymerized manner and wherein the ratio by mass of graft monomers used to butadiene polymers used is 20:80 to 50:50, II) at least one graft polymer, which is obtainable by solution, bulk or suspension polymerization of styrene and acrylonitrile in the weight ratio 90:10 to 50:50, wherein styrene and/or acrylonitrile may be wholly or partially replaced by α-methyl styrene, methyl methacrylate or N-phenyl maleinimide, in the presence of a rubber, wherein the rubber contains 0 to 50 wt. % of a further vinyl monomer in copolymerized manner and wherein the ratio by mass of graft monomers used to rubber used is 70:30 to 95:5, and optionally III) at least one rubber-free copolymer comprising styrene and acrylonitrile in the weight ratio 90:10 to 50:50, wherein styrene and/or acrylonitrile may be wholly or partially replaced by α-methyl styrene, methyl methacrylate or N-phenyl maleinimide.

3. Thermoplastic moulding compositions according to claim 1, wherein the rubbers of Component II have average particle diameters of 100 to 10,000 nm.

4. Thermoplastic moulding compositions according to claim 1, wherein the rubbers of Component II have average particle diameters of 200 nm to 5,000 nm.

5. Thermoplastic moulding compositions according to claim 1, wherein the rubbers of Component II have average particle diameters of 400 nm to 2,000 nm.

6. Thermoplastic moulding compositions according to claim 1, wherein in the production of the graft rubber polymer (I) the butadiene polymer latices (A), (B) and (C) are used in contents of 10 to 40 wt. % of (A), 20 to 37.5 wt. % of (B) and 5 to 50 wt. % of (C) (related to the particular solids content of the latices in each case).

7. Thermoplastic moulding compositions according to claim 1, wherein one or more of the butadiene polymer latices (A), (B) and (C) contain, incorporated by polymerization, up to 50 wt. % of comonomers selected from the group isoprene, chloroprene, acrylonitrile, styrene, α-methyl styrene, $C_1$–$C_4$ alkyl styrenes, $C_1$–$C_8$ alkyl acrylates, $C_1$–$C_8$ alkyl methacrylates, alkylene glycol diacrylates, alkylene glycol dimethacrylates, divinyl benzene or mixtures thereof.

8. Thermoplastic moulding compositions according to claim 1 additionally containing at least one resin selected from aromatic polycarbonate, aromatic polyester carbonate, polyester, polyamide or mixtures thereof.

9. A method of using the composition of claim 1 comprising molding an article therefrom.

10. The molded article prepared by the method of claim 9.

* * * * *